United States Patent
Kersken et al.

(10) Patent No.: US 6,669,170 B2
(45) Date of Patent: Dec. 30, 2003

(54) VACUUM VALVE

(75) Inventors: Heinz-Hermann Kersken, Buchs (CH); Willy Maurer, Sargans (CH)

(73) Assignee: Unaxis Balzers Aktiengesellschaft, Balzers (LI)

( * ) Notice: Subject to any disclaimer, the term of this patent is extended or adjusted under 35 U.S.C. 154(b) by 0 days.

(21) Appl. No.: 09/863,488

(22) Filed: May 23, 2001

(65) Prior Publication Data

US 2002/0011582 A1 Jan. 31, 2002

(30) Foreign Application Priority Data

Jun. 16, 2000 (CH) .............................. 1196/00

(51) Int. Cl.$^7$ .............................................. F16K 31/00
(52) U.S. Cl. ..................... 251/297; 251/251; 251/335.3
(58) Field of Search ................. 251/297, 251, 251/335.3

(56) References Cited

U.S. PATENT DOCUMENTS

| | | | | |
|---|---|---|---|---|
| 2,784,934 A | * | 3/1957 | Paulius, Jr. et al. | 251/297 |
| 3,098,508 A | * | 7/1963 | Claus-Holmer | 251/297 |
| 3,617,026 A | | 11/1971 | Akademicheskaya | 251/296 |
| 3,713,460 A | | 1/1973 | Picker | 137/566 |
| 4,235,258 A | * | 11/1980 | Uno et al. | 251/297 |
| 4,293,118 A | | 10/1981 | Olson et al. | |
| 4,616,805 A | * | 10/1986 | Haas | 251/297 |
| 4,742,848 A | | 5/1988 | Black | 251/297 |
| 4,804,164 A | | 2/1989 | Nakazawa et al. | |
| 4,941,504 A | * | 7/1990 | Beauvir | 251/297 |
| 5,244,182 A | * | 9/1993 | Pacht | 251/297 |
| 5,836,333 A | * | 11/1998 | Haynes | 251/297 |
| 5,899,439 A | * | 5/1999 | Gottwald et al. | 251/297 |

FOREIGN PATENT DOCUMENTS

| | | | |
|---|---|---|---|
| DE | 516207 | 1/1931 | |
| EP | 0952377 | 10/1999 | |
| FR | 2535436 | 5/1984 | |
| GB | 222302 | 10/1924 | |
| GB | 915760 | 1/1963 | |
| GB | 1289237 | 9/1972 | |
| GB | 2164729 | 3/1986 | F16K/7/06 |

OTHER PUBLICATIONS

United Kingdom Search Report, Dated Oct. 24, 2001.

* cited by examiner

*Primary Examiner*—Gene Mancene
*Assistant Examiner*—John Bastianelli
(74) *Attorney, Agent, or Firm*—Notaro & Michalos P.C.

(57) ABSTRACT

A vacuum valve comprising valve housing (1), a continuous line (3) in the valve housing (1) the conductance of which is to be set; a movably supported valve body (5) extending into the line (3) and having a position (H) which defines a conductance through line (3). A setting device (11) is connected to the valve body (5) and having a setting displacement. Locally offset snap-in devices (22; 29, 30) along this setting displacement and effective for snap receiving the setting device (11) for setting displacement positions, the snapping-in at each of the snap-in devices (22; 29, 30) being releasable again by increasing a driving force acting on the setting device (11).

12 Claims, 2 Drawing Sheets

VACUUM VALVE

FIELD AND BACKGROUND OF THE INVENTION

The present invention relates to a vacuum valve with a valve housing, a continuous line, the conductance of which is to be set, in the valve housing, further a valve body movably supported extending into the line, which body, as a function of its position, predominantly defines the conductance of the line, as well as a setting device connected with the valve body.

Fundamentally vacuum valves differ constructionally from valves for other applications in that, apart from other properties, the setting device which sets the valve body or valve disk, as a unit movable with respect to the valve housing, is encapsulated away from the line. This is done in order to avoid contamination by movement abrasion, of the vacuum atmosphere in the line. This encapsulation is often carried out with the aid of a metal bellows, which is installed between the valve body, and the housing-side wall of the line. In this bellows are installed the movable parts of the setting device acting upon the valve body.

Vacuum valves are known in various structural forms of interest, in particular, in the present context in terms of their setting properties. Vacuum valves are known which can be set into two predetermined positions, namely according to the establishment of a minimum value of conductance in their closed position, and a maximum value in their open position. Such "binary" acting vacuum valves are used, for example, as Open/Close valves for purging or evacuating vacuum installations or as lock valves.

Other structural forms of vacuum valves permit the continuous adjustment from minimum conductance (closed position) to maximum conductance (open position), wherein the conductance setting in intermediate positions is not reproducible and can only be roughly estimated.

In the last listed structural form the fast opening or closing of the valves is not possible since for changing over from the one into the other extreme position a relatively long adjustment path must be traversed. If such a valve comprises, for example, a thread guidance between setting device, on the one hand, and housing, on the other hand, it is readily evident that, depending on the pitch of the selected threading, several rotations on the setting device are necessary in order to drive the valve body from the one into the other extreme position.

Such spindle valves conventionally require 5 to 15 actuation rotations in order for the valve body to traverse its complete setting displacement.

SUMMARY OF THE INVENTION

It is the task of the present invention to provide a vacuum valve by means of which precisely predetermined conductances of the valve body-set line are reproducible and rapidly settable.

This is attained in a vacuum valve of the above described type in that, along the setting displacement of the setting device, locally offset snap-in devices are effective into which snaps the setting device for predetermined setting displacement positions. The snapping-in at the particular snap-in devices is again releasable by increasing the driving force acting on the setting device.

By provision according to the invention of said snap-in devices it becomes possible to move the setting device rapidly into a snap-in position, which corresponds to a precisely predetermined valve body position and thus to a precisely predetermined resulting conductance in said line.

In a preferred embodiment of the vacuum valve according to the invention the displacement movement of the valve body is guided by means of a guidance curve on the setting device with respect to the housing. By selecting the guidance curve, the transmission of movement from the input-side driving setting extension to the output-side valve body displacement can be selected. In an embodiment that is highly preferred, according to the invention, a nonlinear transmitter is provided on the vacuum valve which transmits the driving movement at the input side with respect to the setting device—as stated nonlinearly—to the setting displacement for the valve body.

In this way, it becomes possible, for example, to select a dependence between input-side driving movement onto the setting device and resulting setting displacement, which dependence corresponds to a desired conductance change, for example a linear or desired progressive one.

Although the vacuum valve according to the invention can be applied in combination with an exclusively linearly movable setting device, it is highly preferred to be developed with a setting device which is driven rotationally and acts on the valve body via a threading tension curve.

Since, during the displacement of the valve body from its seat, which in the closed valve position is, for example, sealing, the conductance increase for each traversed displacement path unit initially takes place rapidly then increasingly more slowly, in a further preferred embodiment of the vacuum valve according to the invention it is proposed that—viewed from a setting device position for minimum conductance (closed position) toward a setting device position for maximum conductance (open position)—identical setting device driving paths are converted via a nonlinear movement converter into increasing, preferably progressively increasing, valve body paths. In this way, extremely finely and identical driving movement paths, initially only slight valve body displacement paths subsequently increasingly greater ones, are realized, wherewith said conductance can also be set finely stepped, even in the only minimally opened valve body displacement range. For example, it can be adjusted to be linearly stepped.

This is preferably realized in that the setting device is rotationally driven at the input side and, via a thread guidance with a pitch varying as a function of the rotational angle, acts onto the valve body.

In particular with the preferred application of said nonlinear movement converter it is now possible to use only short input-side driving paths in order to drive the valve body from the one into the other extreme position. In a linear movement transmission between input-side driving movement and valve body displacement movement a fine setting of the conductance can only be realized through correspondingly flat transmission in which a small valve body displacement is set through relatively long input-side driving paths. When using the nonlinear transmission provided according to the invention, this can be realized over only a small input-side driving path for the setting device. But therewith simultaneously with the precise settability of the conductance, it is made possible to fully open or fully close the valve according to the invention with a short drive-side movement. This is utilized in the preferred implementation of the vacuum valve according to the invention in which the setting device is rotationally driven at the input side and the entire setting displacement of the valve body is transmitted at a driving rotational movement of maximally 270°, preferably of maximally 135°.

In a further preferred implementation, with the realization of the setting device as rotationally driven at the input side, the snap-in devices are installed as rotation angle snap-in devices in at least one plane perpendicular to the rotational axis of the input-side setting device drive, therein preferably in the form of spring-ball acceptance snap-in devices.

In order to the able in the following to carry out precisely and relatively finely graduated conductance settings on the vacuum valve in the displacement range of the valve body also, it is proposed that, viewed from a setting device position for minimum conductance (closed position) to a setting device position for maximum conductance, the local offset, with respect to the valve body displacement, of the snap-in devices is initially selected to be small and subsequently increasingly greater.

In a further preferred implementation the snap-in devices, structurally combined to form a snap-in unit, can be readily interchanged. This is possible thereby that the snap-in devices are installed on the setting device separately from movement guidances for the displacement movement of the valve body. In an especially preferred implementation of the vacuum valve, the setting device is rotationally driven at the input side and operationally connected with a manually controllable knob. This takes account of the fact that, in particular with manually adjustable vacuum valves, the desired reproducible conductance setting presents a problem.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the following, the invention will be explained by example in conjunction with drawings wherein.

DESCRIPTION OF THE PREFERRED EMBODIMENT

Figure 1:
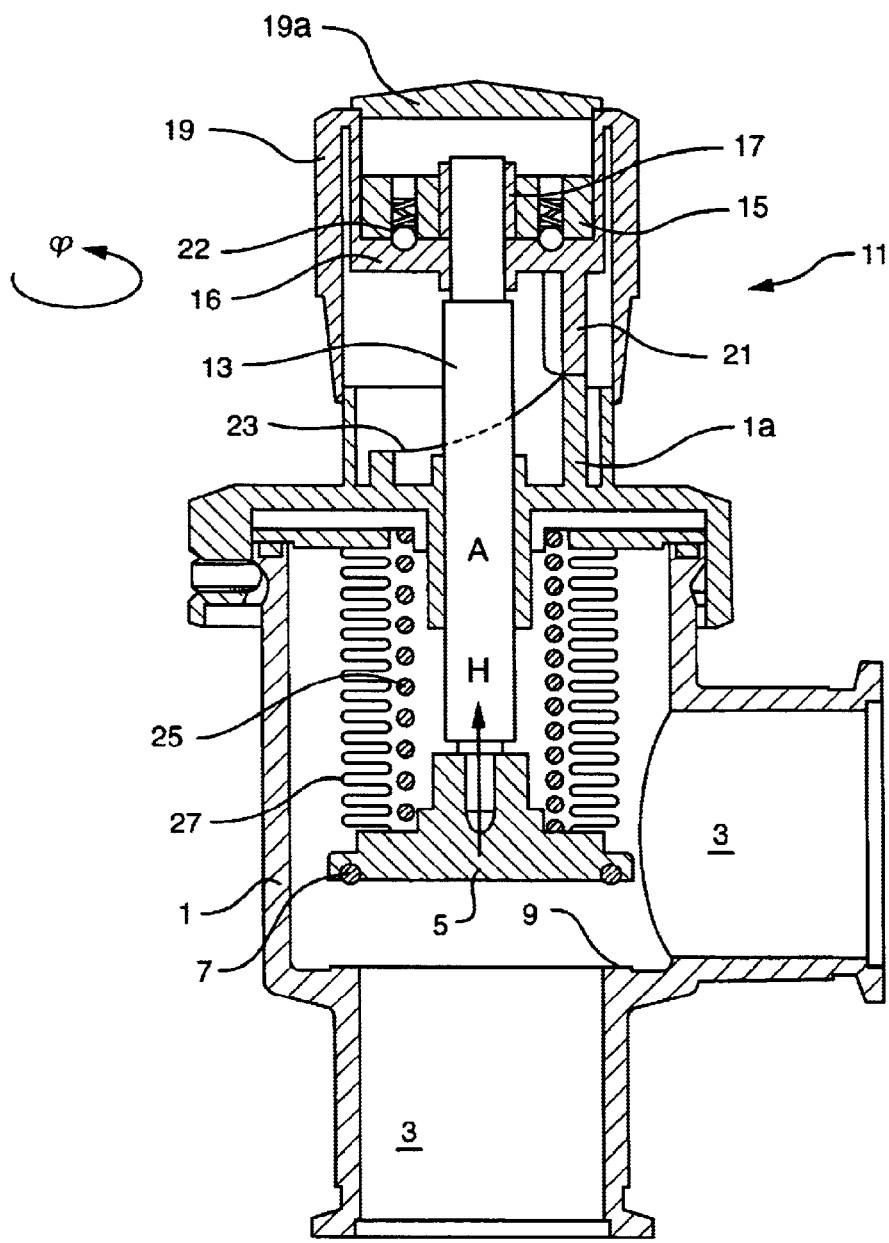
FIG. 1 is a simplified longitudinal sectional view through a vacuum valve according to the invention developed as a corner valve, in a preferred embodiment.

FIG. 1 depicts a vacuum valve according to the invention as a manually operated corner valve. In a housing 1 with a line 3, the conductance of which is to be set, is installed a valve body 5 developed as a valve disk. It is operationally connected via a sealing element 7 with a sealing face 9 on a wall of line 3. A setting device 11 comprises a valve rod 13 which is connected to the valve body 5. At the end of the valve rod 13 opposing the valve body 5 is installed a flange 15 of a snap-in unit, which flange is fixedly connected to the valve rod via a collet 17. A manually controllable knob 19 of the setting device 11 is rotationally movable about axis A with respect to the valve rod 13 and thus with respect to flange 15 of the snap-in unit. It is in contact with a guidance extension 21 on a guidance surface or cam 23, which is formed on the inside wall of housing portion 1a. This guidance surface 23 comprises—as will be explained in connection with FIG. 3—a pitch that is variable with the rotational angle φ about axis A.

The valve body 5 is spring-loaded by means of a compression spring 25 with respect to housing 1. A metal bellows 27 encapsulates setting device 11 with valve rod 13 away from the line 3.

The knob 19, which, as described is rotationally movable, with respect to valve rod 13 and flange 15, comprises a counterflange 16 directly in contact on flange 15. As shown schematically at 22, on flange 15 (or on flange 16) is installed one, preferably two snap balls, spring-loaded in the direction of axis A, and on the face of the counterflange, thus corresponding to 16 or 15, are installed spherical shell-form or circular sector-form snap-in recesses or acceptances 29, 30 as is evident in FIG. 2.

Figure 2:
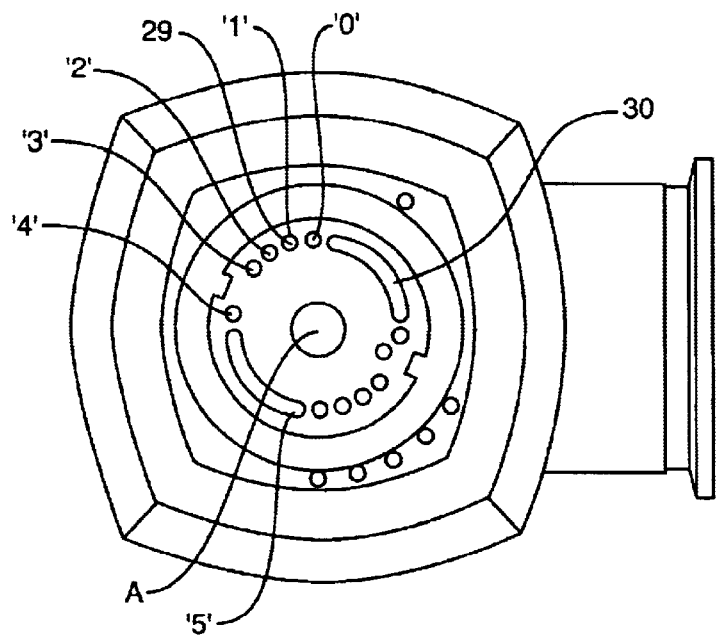
FIG. 2 is a top view onto a snap-in unit on the valve according to FIG. 1.

As shown in FIG. 2, two identically acting snap-in sets with a spring ball and the acceptances are provided preferably symmetrical to axis A. FIG. 1 shows further that the snap-in unit can be interchanged by disassembling a closure cover 19a on knob 19, for example in order to select different assignments of conductance and rotational position of the knob 19.

The valve depicted operates as follows:

The compression spring 25 tensions via valve body 5 and valve rod 13 flange 15 against flange 16 and therewith stays the snap-in unit formed by the spring-mounted balls and snap-in acceptances. Simultaneously the guidance extension 21 is pulled into engagement with the guidance curve 23. If the knob 19 is rotated about axis A, it follows, spring-loaded, the guidance curve 23 in the direction of axis A. It therein remains spring-loaded in engagement with the non-rotating flange 15 of the snap-in device. Therewith the valve rod 13, and thus the valve body 5, courses downwardly, controlled by the nonlinear movement transmitter of guidance curve 23 and guidance extension 21. The flange 16, rotating with the knob 19 with respect to flange 15 brings about, according to the rotational movement (p carried out, the snapping-out and again snapping-in of the balls on the correspondingly provided acceptances 29 or 30 according to FIG. 2.

Figure 3:
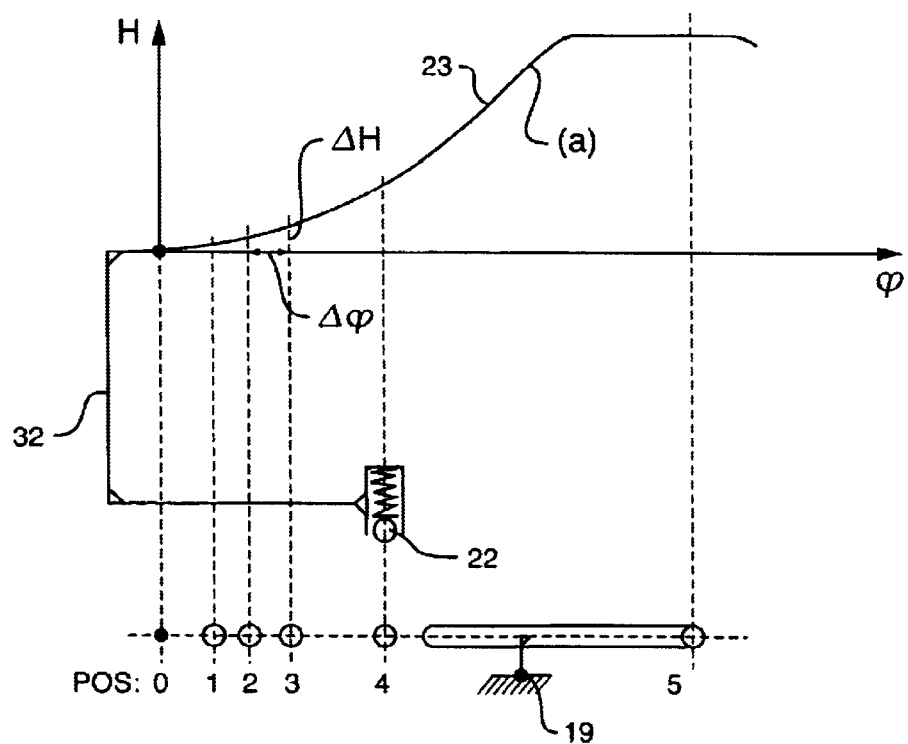
FIG. 3 is an illustration and graph showing position as a function of the rotational driving angle on the valve according to FIG. 1, the valve body displacement and the preferred rotational angle-associated positioning of the snap-in devices provided according to the invention.

With curve (a) the displacement H of valve body 5 according to FIG. 1 is shown in FIG. 3 over the rotational angle φ of knob 19. If φ is defined as being equal to zero in the completely closed position of the vacuum valve, i.e. if sealing element 7 rests on sealing face 9, with linearly increasing rotational angle φ, due to the guidance curve 23 engaged with guidance extension 21, the valve body displacement results depicted with curve (a) of FIG. 3: for identical rotational angle steps Δφ the valve body 5 carries out progressively greater displacement paths ΔH. As shown schematically with the mechanical connection 32 in FIG. 3, the one part of the snap-in device, thus for example the spring-mounted balls 22, is connected torsion-tight with valve body and valve rod, whereas the snap-in acceptances, numbers 0 to 5 in FIGS. 2 and 3, and, as also shown schematically, are torsion-tight with knob 19.

Immediately after the valve body 5 is lifted, as stated, the line conductance changes for each valve body displacement step ΔH significantly more than it changes for identical displacement steps if the valve body 5 is already lifted further. For the shifting up of conductances, relatively finely stepped starting directly with the opening of valve body 5, therefore, as evident in FIGS. 2 and 3, the snap-in positions for the knob 19 are increasingly graduated further apart starting from a relatively dense sequence.

With the explained layout, on the vacuum valve according to the invention, results for example a conductance settability according to the snap-in positions, of

| | |
|---|---|
| 0%: | Position 0 |
| 5%: | Position 1 |
| 15%: | Position 2 |
| 25%: | Position 3 |
| 40%: | Position 4 |
| 100%: | Final stop 5 |

It is furthermore evident that with a rotational movement of knob 19 of maximally 180° the valve can be shifted over between its two extreme positions. In spite of this short setting path, a precisely reproducible conductance setting is realized in intermediate positions, and specifically also for precise settings of low conductances.

While a specific embodiment of the invention has been shown and described in detail to illustrate the application of the principles of the invention, it will be understood that the invention may be embodied otherwise without departing from such principles.

What is claimed is:

1. A vacuum valve comprising:
   a valve housing having a continuous line;
   a movably supported valve body in said valve housing having a movement path relative to said valve housing, the position of said movably supported valve body along said movement path defining a respective conductance through said line;
   a displaceable setting device operationally acting upon said movably supported valve body, thereby setting said position and having a displacement path;
   snap-in devices along said displacement path for snap-in positioning said setting device at predetermined positions along said displacement path;
   said snap-in devices being releasable again by an increase of a displacement force acting upon said setting device;
   said movement path having two ends;
   and wherein at least one of the subsequent is valid:
   the extent of said movement path from one of said ends to a first next subsequent position as set by said setting device at a first predetermined position is different from an extent of said movement path from said first next subsequent position to a further next subsequent position as set by said setting device at a second predetermined position; and
   the extent of said movement path from a first position as set by said setting device at a first predetermined position to a second position as set by said setting device at a second and next subsequent predetermined position is different from the extent from said second position to a third position as set by said setting device at a third next subsequent predetermined position.

2. The valve of claim 1, wherein said displacement path from said first predetermined position to said second predetermined position is equal to an extent of said displacement path from said second predetermined position to said third predetermined position.

3. The valve of claim 1, wherein the extent of said displacement path from said first predetermined position to said second predetermined position is different from the extent of said displacement path from said second predetermined position to said third predetermined position.

4. The valve of claim 1, wherein said setting device operationally acts upon said movably supported valve body via a guidance curve.

5. The valve of claim 1, wherein said setting device is operationally acted upon by said movably supported valve body via a non-linear transmitter arrangement.

6. The valve of claim 1, wherein said setting device is rotationally displaceable and is operationally acting upon by said movably supported valve body via a thread arrangement.

7. The valve of claim 1, wherein at least one of the following is valid:
   said one end defining for minimum conductance through said line and the extent of said movement path from said end to said first next subsequent position being smaller than said extent from said first next subsequent position to said further next subsequent position; and
   said conductance through said line being smaller at said first position than at said second position and said extent from said first position to said second position being smaller than said extent from said second position to said third position.

8. The valve of claim 1, wherein said setting device is rotationally displaceable and is operationally acting upon by said movably supported valve body via a thread arrangement with a varying pitch.

9. The valve of claim 1, wherein said setting device is rotationally displaceable and wherein said valve body is moved from said one end to said second end by rotating said setting device by a maximum of 270°.

10. The valve of claim 9, wherein said rotational movement is maximum 135°.

11. The valve of claim 1, wherein said snap-in devices comprise spring-biased balls and recesses.

12. The valve of claim 1, wherein at least a part of said valve body is bellows-encapsulated with respect to said valve housing.

* * * * *